United States Patent [19]

Aldred

[11] Patent Number: 4,511,689

[45] Date of Patent: Apr. 16, 1985

[54] BLENDS OF HARDENED EXTRACT WITH COPOLYMERS OF OLEFIN/ALKYL ACRYLATE

[75] Inventor: Alan C. G. Aldred, North Cheam, England

[73] Assignee: The British Petroleum Company p.l.c., London, England

[21] Appl. No.: 446,567

[22] Filed: Dec. 3, 1982

[30] Foreign Application Priority Data

Dec. 11, 1981 [GB] United Kingdom ............... 8137530

[51] Int. Cl.$^3$ ............................................. C08F 220/10
[52] U.S. Cl. ....................................... 524/484; 524/62; 524/63; 524/65; 524/66; 524/67; 524/69
[58] Field of Search .................... 524/484, 62, 63, 65, 524/66, 67, 69

[56] References Cited

U.S. PATENT DOCUMENTS

| | | | |
|---|---|---|---|
| 3,249,567 | 5/1966 | Vigneault | 524/69 |
| 3,303,149 | 2/1967 | Fink et al. | 524/62 |
| 3,336,252 | 8/1967 | Raichle et al. | 523/315 |
| 3,414,533 | 12/1968 | Trieschmann et al. | 524/62 |
| 4,081,502 | 3/1978 | Blümel et al. | 524/62 |
| 4,098,739 | 7/1978 | Westermann | 524/484 |
| 4,162,999 | 7/1979 | Bohemen | 524/484 |

FOREIGN PATENT DOCUMENTS 1044011  9/1966  United Kingdom ................ 524/66

*Primary Examiner*—Paul R. Michl
*Assistant Examiner*—Alex H. Walker
*Attorney, Agent, or Firm*—Brooks Haidt Haffner & Delahunty

[57] ABSTRACT

This invention relates to a blend of an olefin/alkyl acrylate copolymer and hardened extract which has a saturated hydrocarbon content of not more than 10% by weight and articles made therefrom, e.g. linings for reservoirs and for water proofing roofs. The new products are easier to manufacture since they resist gelation, do not suffer from problems of shrinkage and are appreciably cheaper.

9 Claims, No Drawings

BLENDS OF HARDENED EXTRACT WITH COPOLYMERS OF OLEFIN/ALKYL ACRYLATE

The present invention relates to blends of hardened extract with copolymers of an olefin and an alkyl acrylate.

Elastomer blends containing hardened extract and chlorosulphonated polyethylene are known for use as waterproof membranes, eg for tank linings as shown by "Encyclopedia of Chemical Technology" edited by Kirk-Othmer 2nd Edition, Volume 7, page 695. Chlorosulphonated polyethylene elastomers have a number of disadvantages however, Thus for many purposes they have too low a modulus and tear strength.

It would be desirable to find a method of improving the physical properties of chlorosulphonated polyethylene elastomers and also a way of making a cheaper product based on modified polyethylene elastomers. When attempts are made to add bitumen to chlorosulphonted polyethylene to give a cheaper product, the resulting material has an exceedingly low tensile strength and modulus.

Although useful compositions have been obtained by using, instead of bitumen, a product known as hardened extract or aromatic extract resin, such compositions cause gelation of the copolymer if high processing temperatures are used.

It has been found that these problems can be mitigated by replacing the chlorosulphonated polyethylene ith an olefin/alkyl acrylate copolymer.

According to the present invention there is provided a blend of an olefin/alkyl acrylate copolymer and hardened extract (as hereinafter defined), said hardened extract having a saturated hydrocarbon content of not more than 10% by weight.

According to yet another aspect of the present invention there is provided an article comprising an olefin/alkyl acrylate copolymer and hardened extract having a saturated hydrocarbon content of not more than 10% wt/wt.

THE OLEFIN/ALKYL ACRYLATE COPOLYMER

The olefin/alkyl acrylate copolymers used in the present invention are suitably elastomers. Such copolymers and methods of production thereof are described, for instance, in U.S. Pat. Nos. 2,953,541 and 2,953,551. The olefins in the copolymer is preferably ethylene or propylene and the alkyl acrylate is preferably methyl acrylate, ethyl acrylate, propyl acrylate, pentyl acrylate, 2-ethyl hexyl acrylate or decyl acrylate. Copolymers of ethylene and ethyl acrylate are most preferred. In this case the ethylene polymer is preferably a low density polyethylene. The olefin/alkyl acrylate copolymer in general, and the ethylene/ethyl acrylate copolymer in particular, suitably contains between 3 and 18% by weight, preferably between 8 and 18% by weight, of the alkyl acrylate.

THE HARDENED EXTRACT

Throughout this specification 'hardened extract' means a material obtained by blowing a gas containing free oxygen into a petroleum extract at elevated temperatures, the petroleum extract having been obtained by the solvent extraction of a product of petroleum refining which is a distillate petroleum fraction or a de-asphalted petroleum residue, which product boils above 350° C. at atmospheric pressure and which contains a major proportion of aromatic hydrocarbons.

The product of petroleum refining subjected to solvent extraction may be for example a vacuum distillate obtained by vacuum distillation of a residue from an atmospheric pressure distillation. Alternatively, the product of the petroleum refining may be obtained from vacuum residue (the residue of the vacuum distillation referred to above) after asphaltenes have been removed by precipitation with liquid propane. A product containing a major proportion of aromatic hydrocarbons may be derived by solvent extraction of mixtures of distillates and residues.

A by-product of petroleum refining is vacuum distillate which is in the lubricating oil boiling range of 350° C. to 600° C. Such vacuum distillates are well known to those skilled in the art.

The elevated temperature at which the gas containing free oxygen eg air is blown into the petroleum extract may for example be 200° to 350° C.

Examples of solvents which may be used to extract the petroleum distillate fraction are furfural, phenol and N-methyl pyrrolidone. The product subjected to extraction is substantially free from asphaltenes, and this extraction process must be distinguished from a process in which liquid propane is used to obtain from residues a product rich in asphaltenes. The latter process is sometimes described as a 'solvent' process.

Examples of such petroleum extracts are materials sold under the designation 'Enerflex'(Regd. Trade Mark) Process Oils by BP Oil International Limited, London. It is desirable that the hardened extract is prepared from a petroleum extract having a content of 'saturates' and 'aromatics' as determined by molecular-type analysis (clay-gel) ASTM D2007, of less than 15% by weight preferably less than 10% by weight for saturates, and suitably more than 75% by weight, preferably more than 80% by weight for aromatics.

The 'hardened extract' resulting from the air blowing referred to above is a solid material at room temperature. In order to obtain a hardened extract having the desired low content of saturated hydrocarbons it may be necessary to select a petroleum extract in which the saturated hydrocarbon content is low. The choice of a suitable petroleum extract can readily be made by the man skilled in the art on the basis of simple tests. The blowing with air may be carried out in the presence of a catalyst eg a metal halide Friedel-Crafts catalyst such as ferric chloride, or without a catalyst.

The hardened extracts used in the present invention are to be distinguished from bitumens by the fact that they are made by either distillation or by de-asphalting a residue, followed by a solvent extraction, to produce a product which is substantially free of asphaltenes, the asphaltenes only being introduced by blowing with a gas containing free oxygen. When crude oil is distilled to remove materials boiling up to the end of the gas oil range, the resulting residue, known as atmospheric residue, can be subjected to vacuum distillation to recover waxy distillates. The residue from this vacuum distillation is known as vacuum residue. The bitumen may be obtained directly from this residue or the residue may be air blown to produce a low penetration bitumen. Alternatively, the residue (either atmospheric or vacuum) may be treated with for example liquid propane to precipitate a bitumen layer. In all these cases the asphaltenes in the bitumen comes directly from the residue, and there is no intermediate material formed which is substantially free of asphaltenes.

The composition of hardened extracts and bitumens may be determined on the basis of their content of certain classes of material, namely 'asphaltenes', 'toluene insolubles', 'saturates', 'cyclics' and 'resins'. In this method asphaltenes are defined as that fraction which is precipitated by a large excess of n-heptane but which is soluble in toluene. Toluene insolubles are that fraction which is insoluble in toluene. Saturates are defined as that fraction which is eluted by n-heptane from an alumina/silica gel column, cyclics as that fraction which is eluted by toluene, and resins as that fraction which is eluted by a 50/50 toluene/absolute ethanol mixture.

Typical data on hardened extracts and bitumens are given in Table 1 where "HE" means 'hardened extract' and the number following "HE" is the softening point.

It will be seen that the hardened extracts have lower saturated hydrocarbon contents and much higher asphaltenes and toluene insolubles contents than either straight run or blown bitumens of equivalent softening point. The hardened extracts used suitably have asphaltenes plus toluene insolubles contents of at least 20% by weight. Preferably the content of asphaltenes alone is at least 20% by weight.

Hardened extracts having a range of softening points are readily available. Thus hardened extracts having softening points ranging from 50° C. to 200° C. may be used. It is preferred to use hardened extracts having a softening point in the range 85°-170° C. The softening point of hardened extract is measured by the ring and ball test used to determine the softening point of bitumens. This is described in Chapter 13 page 12 l of "Petroleum Products Handbook" edited by Guthrie and published in 1960 by McGraw Hill.

TABLE 1

| BROAD CHEMICAL COMPOSITION OF BLOWN BITUMEN AND HARDENED EXTRACTS | | | |
| --- | --- | --- | --- |
| | 115/15 Blown Kuwait Bitumen | 85/25 Straight Run Bitumen | HE 140 |
| Softening Point Ring and Ball °C. | 115 | 85 | 140 |
| Penetration at 25° C. mm/10 | 15 | 25 | less than 1 |
| BCC Analysis % | | | |
| Saturates | 18.1 | 10.0 | 9.6 |
| Cyclics | 33.2 | 55.3 | 28.0 |
| Asphaltenes | 32.5 | 7.1 | 50.4 |
| Resins | 14.9 | 26.1 | 12.2 |
| Toluene Insolubles | 2.1 | 1.5 | 40.5 |

CHLORINATED POLYETHYLENES

The composition of the present invention may contain chlorinated polyethylenes in addition to the olefin-/alkyl acrylate copolymer and the hardened extract.

Chlorinated polyethylenes with chlorine contents of from 20 to 48% by weight may be used. It is preferred to use chlorinated polyethylenes based on high density polyethylene having chlorine contents of from 25 to 40% by weight chlorine. Particularly preferred are chlorinated polyethylenes CPE 2552 and CPE 3614 which contain 25% and 36% by weight chlorine respectively and which are manufactured by Dow Chemical Company.

OTHER OPTIONAL ADDITIONAL INGREDIENTS

The compositions of the present invention may also contain particulate fillers that are commonly used in reinforcing rubber, eg calcium carbonate, carbon black, titanium dioxide, clay, talc, etc. The use of these fillers can improve the tear strength of the blend. Fibrous fillers and coated fibrous fillers such as asbestos, cotton, polyester fibres, rayon fibres etc may also be used.

The compositions of the present invention may also contain various additives, eg to plasticise, to lubricate, to stabilise, to enhance fire resistance and to prevent oxidation, providing these are compatible with the composition, ie do not readily separate from the composition after being mixed with it. Compatibility is particularly significant in the context of plasticisers. Examples of such plasticisers are aromatic extracts (this being the material from which hardened extract is prepared), chlorinated paraffins, for example those having from 12 to 30 carbon atoms in the molecule, and esters, for example di-2-ethylhexyl phthalate or alkyl epoxy stearates. Plasticisers for use in olefin/alkyl acrylate copolymers are well known to those skilled in the art.

Compositions containing the above-mentioned optional additional ingredients may be used in either unvulcanised or vulcanised form.

RELATIVE QUANTITIES OF INGREDIENTS

The relative weights of olefin/alkyl acrylate copolymer and hardened extract used in the compositions of the present invention may vary over a wide range but are preferably 4:1 to 1:10, more preferably 2:1 to 1:5, for example 1:1.

Where chlorinated polyethylene is present the weight of chlorinated polyethylene relative to olefin/alkyl acrylate copolymer is preferably in the range 1:9 to 4:1, more preferably 1:4 to 2:1, for example 1:1.

The quantity of particulate filler, if present, is preferably in the range 1 to 250, more preferably 10 to 150 parts per hundred parts of the olefin/alkyl acrylate copolymer (and chlorinated polyethylene, if present), all parts being by weight.

The quantity of plasticiser, if present, is preferably in the range 1 to 50, more preferably 5 to 25 parts by weight per hundred parts by weight of the olefin/alkyl acrylate copolymer (and chlorinated polyethylene if present).

The quantity of fibrous filler, if present, is preferably in the range 1 to 50, more preferably 2 to 25 parts by weight per hundred parts by weight of the olefin/alkyl acrylate copolymer (and chlorinated polyethylene if present).

PREPARATION OF THE COMPOSITIONS

The compositions of the present invention may be prepared by any convenient method. Thus any of the methods used in compounding rubbers may be used, eg the methods using a Banbury mixer,, or a 2-roll mill.

USES OF COMPOSITIONS ACCORDING TO THE PRESENT INVENTION

Compositions according to the present invention are particularly useful when formed into articles, especially into sheets for lining reservoirs or for waterproofing roofs. Such sheets may be, for example, formed by moulding or by calendering between heated rollers. The compositions of the present invention may be also used to produce bituminous mastic backed products, polyester felt backed products and laminates in which non-woven scrims may be used as reinforcements. Bitumen is compatible with the compositions of the present invention and causes no bleeding.

The invention will now be illustrated by the following Examples in which all parts are parts by weight.

The meaning of the various trade names and abbreviations used in these Examples is as follows:

| Terms | Meaning |
|---|---|
| Hypalon 45 | A chlorosulphonated polyethylene containing 25% Cl and 1.0% of S produced by E. I. du Pont de Nemours. |
| He 140 | A Hardened Extract having a softening point of 140° C. |
| EEA 6178 | An ethylene ethyl acrylate copolymer containing 10% ethyl acrylate and produced by BP Chemicals Limited. |
| FEF Black | A fast extrusion furnace carbon black produced by Cabot. |
| CPE 3614 'A' | A chlorinated polyethylene containing 36% chlorine produced by Dow. |
| Mistron talc | Pure magnesium silicate. |
| Rigidex HDPE 180/52 | High Density Polyethylene produced by BP Chemicals Limited. |
| Edenol B35 | An alkyl epoxy stearate plasticiser produced by Henkel et Cie. |
| Amine | Octadecylamine processing aid. |

EXAMPLES 1-6

A composition was prepared by mixing all the ingredients (shown for the respective Examples in Table 2 below) in a 1-liter laboratory Banbury rubber mixer at 130°-140° C. for 10 minutes. The resulting mixture was then milled on a 6"×12" two roll laboratory mill at 130° C. for 60 minutes to assess the effect of extensive processing. No gelation occurred during the milling as evidenced by the smooth appearance of the sheet on the mill.

1 mm thick sheets from which samples of testing physical properties were cut, were prepared by moulding the composition taken from the mill for 5 minutes a 130° C. and then cooling the sheets in the mould.

The ingredients used and the results obtained are shown in Tables 2 and 3.

COMPARATIVE TEST (NOT ACCORDING TO THE INVENTION)

A composition was prepared by mixing all the ingredients shown in Table 2 in a 1-liter laboratory Banbury rubber mixer at 130°-140' C. for 10 minutes. The resulting mixture was then milled on a 6"×12" two-roll laboratory mill at 130° C. for 60 minutes. The mixture became rough in texture and very sticky on the mill. The mixture had gelled. 1 mm thick sheets from which samples for testing physical properties were cut, were prepared by moulding the composition taken from the mill for 5 minutes at 130° C. and then coding the sheets in the mould.

The ingredients used and the results obtained are shown in Tables 2 and 3.

TABLE 2

Ingredients (parts by weight)
(Total charge fed to the Banbury mixer was 1.1 kg in each cases, the proportions by weight being as before)

| Example | EEA | CPE 3614A | HYPALON 45 | HDPE 180/52 | HE 140 | BLACK FEF | TALC MISTRON | EDENOL B35 | AMINE |
|---|---|---|---|---|---|---|---|---|---|
| 1 | 40 | 60 | 0 | 0 | 85 | 40 | 0 | 8 | 1 |
| 2 | 50 | 50 | 0 | 0 | 85 | 40 | 0 | 8 | 1 |
| 3 | 60 | 40 | 0 | 0 | 85 | 40 | 0 | 8 | 1 |
| 4 | 40 | 50 | 0 | 10 | 85 | 40 | 10 | 8 | 1 |
| 5 | 50 | 50 | 0 | 0 | 90 | 40 | 0 | 8 | 1 |
| 6 | 50 | 50 | 0 | 0 | 85 | 40 | 10 | 8 | 1 |
| Comparative Test | 0 | 50 | 50 | 0 | 85 | 40 | 0 | 8 | 1 |

TABLE 3

| | Physical Properties | | | | | | |
|---|---|---|---|---|---|---|---|
| Test Method | Dimensional stability DIN 53377 | Brittle Temp. DIN 53361 | Tensile strength BS 903 Part A2 | Elongation at break BS 903 Part A2 | Modulus at 300% BS 903 Part A2 | Test Strength BS 903 Part A3 | Shore 'A' BS 903 Part A26 |
| Example No. | | | | | | | |
| 1 | 1.5% | −20° C. | 7.4 | 670 | 4.2 | 38 | 69 |
| 2 | 1.0% | −25° C. | 6.3 | 720 | 3.8 | 41 | 72 |
| 3 | 0.5% | −22.5° C. | 6.4 | 620 | 4.5 | 41 | 74 |
| 4 | 0 | — | 6.0 | 600 | 4.7 | 40 | 78 |
| 5 | 0.5% | −22.5° C. | 6.3 | 710 | 3.7 | 39 | 72 |
| 6 | 0.5% | −20° C. | 5.8 | 670 | 4.0 | 42 | 71 |
| Comparative Tests | 14% | −25° C. | 8.3 | 580 | 5.6 | 40 | 62 |

From the above results, in particular by a comparison of the data in Example 2 with the Comparative Test, it can be seen that compositions containing ethylene/ethyl acrylate copolymer instead of a chlorosulphonated polymer were vastly superior showing no gelling and possessing the desired characteristics such as high tensile strength, high elongation at break, low modulus and high Shore 'A' tests. Under the conditions used, the product from the Comparative Tests, in fact, gelled and vulcanised.

I claim:

1. A blend of an olefin/alkyl acrylate copolymer and hardened extract, said hardened extract having a saturated hydrocarbon content of not more than 10% by weight and being obtained by blowing a gas containing free oxygen into a petroleum extract at elevated temperature, the petroleum extract having been obtained by the solvent extraction of a product of petroleum refining which product is a distillate petroleum fraction or a deasphalted petroleum residue, which product boils above 350° C. at atmospheric pressure and contains a major proportion of aromatic hydrocarbons.

2. A blend according to claim 1 wherein the olefin in the copolymer is ethylene or propylene and the alkyl acrylate is selected from methyl acrylate, ethyl acrylate, propyl acrylate, pentyl acrylate, 2-ethyl hexyl acrylate and decyl acrylate.

3. A blend according to claim 2 wherein the copolymer is derived from ethylene and ethyl acrylate.

4. A blend according to claim 3 wherein the ethylene polymer is a low density polyethylene.

5. A blend according to claim 1 wherein the olefin/alkyl acrylate copolymer contains between 3 and 18% by weight of the alkyl acrylate.

6. A blend according to claim 1 wherein the relative weights of olefin/alkyl acrylate copolymer and hardened extract in the blend is in the range 4:1 to 1:10.

7. A blend according to claim 1 wherein the blend contains in addition a chlorinated polyethylene.

8. A blend according to claim 7 wherein the weight of chlorinated polyethylene relative to olefin/alkyl acrylate copolymer is in the range 1:9 to 4:1.

9. An article comprising an olefin/alkyl acrylate copolymer and hardened extract, said hardened extract having a saturated hydrocarbon content of not more than 10% by weight and being obtained by blowing a gas containing free oxygen into a petroleum extract at elevated temperature, the petroleum extract having been obtained by the solvent extraction of a product of petroleum refining which product is a distillate petroleum fraction or a deasphalted petroleum residue, which product boils above 350° C. at atmospheric pressure and contains a major proportion of aromatic hydrocarbons.

* * * * *

UNITED STATES PATENT AND TRADEMARK OFFICE
CERTIFICATE OF CORRECTION

PATENT NO.   :   4,511,689
DATED        :   April 16, 1985
INVENTOR(S)  :   ALAN C.G. ALDRED It is certified that error appears in the above-identified patent and that said Letters Patent is hereby corrected as shown below:

Col. 1, line 31, "ith" should read --with--

Col. 3, line 34, "page 121 of" should read --page 12 of--

Col. 6, line 3, "samples of testing" should read --samples for testing--

Signed and Sealed this

Twenty-seventh Day of August 1985

[SEAL]

Attest:

DONALD J. QUIGG

*Attesting Officer*        *Acting Commissioner of Patents and Trademarks*